United States Patent [19]
Beach

[11] 3,709,128
[45] Jan. 9, 1973

[54] FILM METERING MECHANISM
[75] Inventor: David E. Beach, Penfield, N.Y.
[73] Assignee: Eastman Kodak Company, Rochester, N.Y.
[22] Filed: March 16, 1972
[21] Appl. No.: 235,143

[52] U.S. Cl. ............................ 95/31 FM, 95/31 FL
[51] Int. Cl. .............................................. G03b 1/62
[58] Field of Search ............ 95/31 FM, 31 FL, 31 AC

[56] References Cited

UNITED STATES PATENTS 3,628,432   12/1971   Ettischer............................95/31 FM Primary Examiner—Robert P. Greiner
Attorney—W. H. J. Kline et al.

[57] ABSTRACT

A camera for roll film perforated at predetermined metering intervals includes a transport mechanism for advancing the film along an exposure plane and metering system for stopping film transport when the film is correctly positioned for exposure. The metering system includes a metering lever movable between an active position disabling the transport mechanism and an inactive position, a film sensing pawl spaced from the metering lever and mounted for movement between a retracted position resting on the film surface and extended positions while in a film perforation and a latch member which is mounted for blocking or releasing the metering lever and which is coupled to the sensing pawl. The latch member is spring biased so as to urge the sensing pawl into pressure engagement with the trailing edge of a film perforation and is movable by the sensing pawl to a position in which the metering level can disable film transport. The spring bias on the latch member is applied in a manner so as to reduce the frictional restrain on the metering system so that a serge of force is not released to the pawl by the spring force on the latch member during film exposure.

5 Claims, 7 Drawing Figures

FILM METERING MECHANISM

CROSS-REFERENCE TO RELATED APPLICATION

Reference is made to my coassigned, copending U.S. application Ser. No. 203,524, entitled "Film Metering Mechanism For Cameras," filed Dec. 1, 1971.

BACKGROUND OF THE INVENTION

1. Field of the Invention

The present invention relates to devices for sensing the presence of a film perforation to selectively lock and release the film transport mechanism of a camera, and more particularly to such a device for minimizing any serge of force on the film during the exposure interval.

2. Description of the Prior Art

The present invention is an improvement over the mechanism disclosed in my commonly assigned, copending U.S. Pat. application, Ser. No. 203,524, entitled "Film Metering Mechanism For Cameras," filed Dec. 1, 1971. In the camera therein disclosed, a metering lever is movable in a first plane parallel to and adjacent the surface of a mechanism plate between an active position disabling the camera's film transport mechanism and an inactive position. A film sensing pawl is mounted on a post in a second plane spaced from and parallel to the first plane for longitudinal movement from a retracted position engaging the film surface to an extended position transversing the film when intercepting one of the film perforations. The pawl is also rotatably movable from its extended position to a metering position by the trailing edge of the perforation as the film is advanced along the exposure plane.

A latch member includes a first portion in the plane of the metering lever for movement between a latch position blocking movement of the metering lever to its active position and a release position. An abutment on the latch member is engageable by the sensing pawl in the second plane to move the latch member to its release position during movement of the sensing pawl from its extended position to its metering position. A spring, acting on the latch member substantially in the plane of the metering lever applies a resilient force tending to move the latch member to its latch position and the sensing pawl to its extended position. Since the metering pawl remains in the film perforation during exposure, the spring force is applied also to the trailing edge of the film perforation. This force on the film is opposed by frictional forces between the latch member and adjacent camera parts and between the film and camera and/or cartridge surfaces.

When the shutter is tripped, minor vibrations travel through the camera. These vibrations may suddenly relieve static friction wherever it occurs within the camera. Loss of the frictional forces restraining the film can cause the spring force on the film from the pawl to move the film during exposure.

Because the spring biasing the latch member toward its latch position does not act in the same plane as the force of the sensing pawl on the latch member, a force moment is applied to the latch member as the sensing pawl moves toward its metering position. This force moment may tend to cause rubbing between the latch member and the mechanism plate so that when the camera is metered and ready for exposure, the spring force is opposed by an additional amount of friction, i.e., a bind is created preventing movement of the pawl to its equilibrim position. Now when the shutter is tripped, this additional friction may be suddenly relieved; resulting in additional spring force being transmitted to the film through the sensing pawl. This additional force, coupled with the simultaneous loss of other frictional restraints, may cause film movement during the exposure period.

SUMMARY OF THE INVENTION

It is an object of the present invention to reduce or eliminate the possibility of film movement during the exposure period by reducing any serge of force by the film sensing pawl on the trailing edge of the film perforation when camera vibrations suddenly relieve frictional restraints.

In a preferred embodiment of the present invention, this object has been accomplished by modifying the camera mechanism disclosed in hereinbefore mentioned U.S. Pat. application, Ser. No. 203,524 by applying a resilient force to the latch member substantially in the same plane as the force applied thereto by the sensing pawl so as to minimize any force moment on the latch member during movement of the latch member to its release position which would tend to move the first portion of the latch member into frictional engagement with the surface of the mechanism plate.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which.

DESCRIPTION OF THE PREFERRED EMBODIMENT

Figure 1:
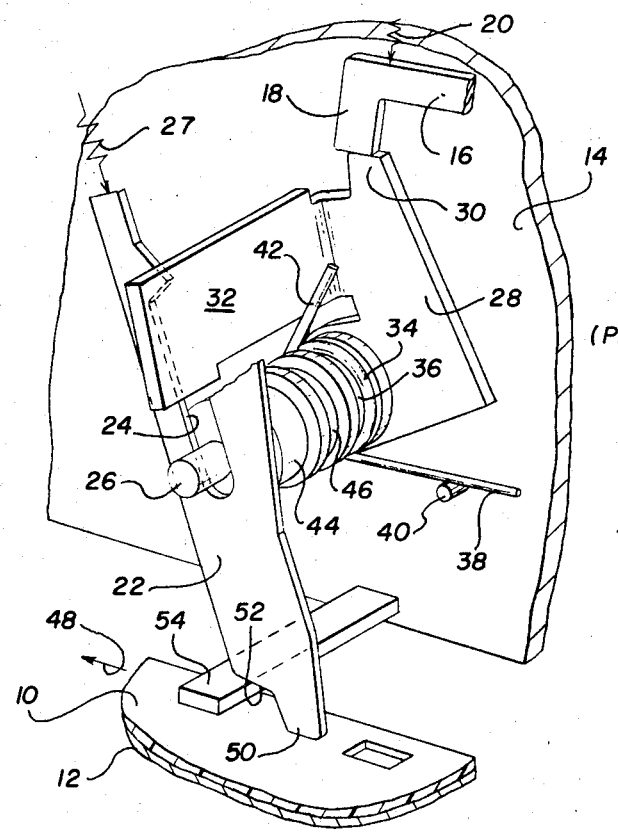
FIGS. 1–3 are perspective sectional views of a camera known in the prior art.

Because cameras are well known, the present description will be directed in particular to elements forming part of, or cooperating more directly with, apparatus in accordance with the present invention. It is to be understood that camera elements not specifically shown or described may take various forms well known to those skilled in the art.

FIGS. 1–4 show a portion of the camera described in my above-mentioned application, Ser. No. 203,524, the disclosure of which is hereby specifically incorporated herein. A portion of a filmstrip 10 and backing paper 12 is shown in an exposure plane which lies perpendicular the surface of a mechanism plate 14 in the camera. A portion 16 of a metering lever includes a tab 18. The metering lever is urged in the direction shown by a spring 20 for movement from an inactive position to an active position for disabling a film transport mechanism, not shown. A film sensing pawl 22 has a slot 24 through which a post 26 extends so that sensing pawl 22 may move rotatably about the post and longitudinally relative thereto. A spring 27 urges the sensing pawl downwardly as viewed in FIGS. 1–3 into engagement with the surface of film 10.

Figure 2:
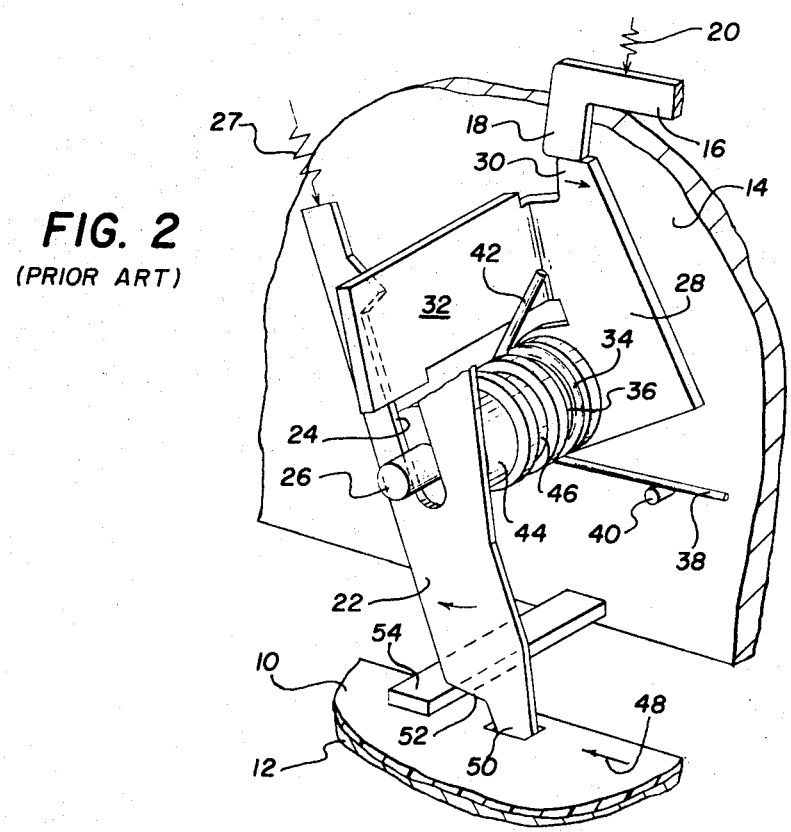
Figure 3:
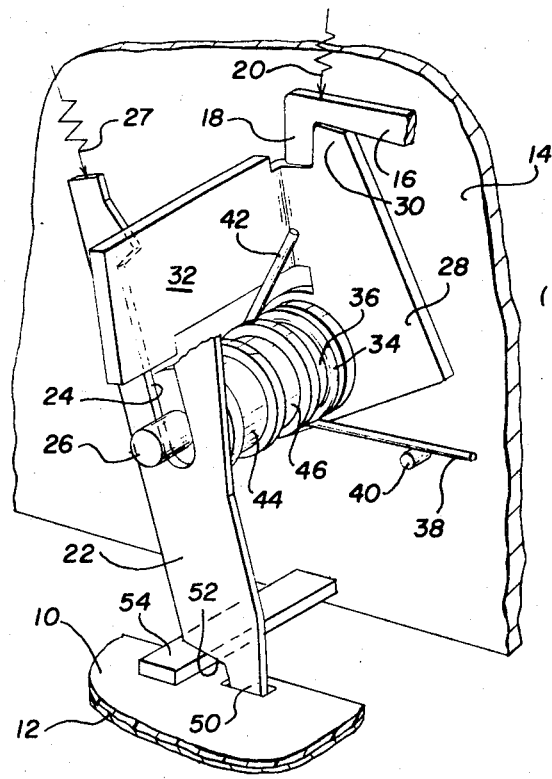

A latch member 28 is rotatably carried by post 26 adjacent to the surface of mechanism plate 14. The latch member has a tab 30 and an abutment portion 32 which extends in a direction generally perpendicular to the mechanism plate through slot 24 in metering pawl 22. A wire torsion spring 34 is wrapped about an annular groove 36 in post 26 and has a first leg 38 which abuts a stud 40 extending from the mechanism plate and a second leg 42 which contacts abutment portion 32 of latch member 28, tending to rotate the latch member in a counterclockwise direction as shown in FIGS. 1–3. The force of spring 34 is transmitted along abutment portion 32 of the latch member to sensing pawl 22 to tend to rotate the sensing pawl in a counterclockwise direction also. Two other annular grooves 44 and 46 have been provided for rotatably supporting camera elements which are not shown and which do not form a part of the present invention.

Referring to FIG. 1, the camera elements are shown positioned after an exposure has been made and as film 10 is being advanced in the direction of arrow 48 to the next exposure area. Sensing pawl 22 has been withdrawn to a retracted position on one side of the exposure plane and is urged by spring 27 into engagement with the film surface. Spring 34 has rotated latch member 28 to a position wherein tab 30 blocks movement of metering lever 16 to its active position. As the film is advanced, friction between the film surface and sensing pawl 22 tends to rotate the sensing pawl in a clockwise direction. However, this tendency is opposed by the force of spring 36 acting through abutment portion 32 of latching member 28.

As the next succeeding perforation reaches the end of sensing pawl 22, spring 27 moves the sensing pawl downwardly until the nose 50 of the sensing pawl enters the perforation as shown in FIG. 2. As the film continues to be advanced, the trailing edge of the perforation exerts a force on nose 50 of sensing pawl 22 to rotate the sensing pawl in a clockwise direction. As the pawl rotates, it exerts a force F (FIG. 4) on abutment portion 32 of latching member 28 to likewise rotate the latching member in a clockwise direction until tab 18 of metering lever 16 falls off of tab 30 of the latching member so that the metering lever may be moved by spring 20 to its active position, disabling the film transport mechanism (see FIG. 3).

When an exposure is made, metering lever 16 is raised so that tab 18 clears tab 30 and is held in this position until initial film advancement as described in U.S. application, Ser. No. 203,524. As the film moves, sensing pawl 22 is further rotated in a clockwise direction until its cam surface 52 engages a tab 54 extending from mechanism plate 14 to lift the sensing pawl out of the film perforation. Spring 34 now rotates latch member 32 in a counterclockwise direction to align tab 30 thereon with tab 18 of metering lever 16 and to rotate sensing pawl 22 to its position shown in FIG. 1.

Figure 4:
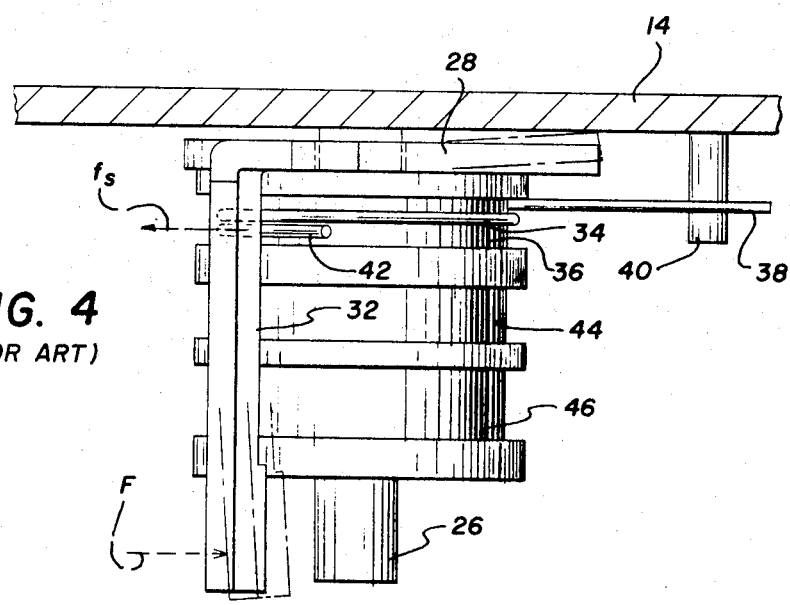
FIG. 4 is a top sectional view of the portion of the camera shown in FIGS. 1–3.

Referring to FIG. 4, I will now consider the forces on latching member 28. Spring 34 exerts a force $f_s$ on abutment portion 32. Force $f_s$ is opposed by frictional forces between the latching member and the surface of the mechanism plate, frictional forces between the latching member and post 26 and force F of sensing pawl 22 on abutment portion 32. Since the force of spring 34 on abutment portion 32 acts in a plane spaced from the plane of force F, a force moment is set up tending to rotate the latching member about an axis generally parallel to mechanism plate 14. This tends to move the latching member to the phantom line position shown in FIG. 4, increasing the frictional force on the latching member from the surface of the mechanism plate. This movement has been shown exaggerated in FIG. 4 to more clearly illustrate this phenomenon. Thus, when the camera is cocked and ready for an exposure, force $f_s$ is opposed by force F and the sum of certain frictional forces in the camera including the frictional force between mechanism plate 14 and latching member 28.

As mentioned hereinbefore, as the shutter is tripped, minor vibrations travel through the camera to suddenly relieve static friction. If the friction between latching member 28 and the surface of mechanism plate 14 is relieved as the shutter trips, the force of spring 34 on pawl 22 is momentarily increased, tending to move the film. This problem is compounded by the simultaneous reduction in friction between the film and the film gate caused by exposure vibrations of the camera.

Figure 5:
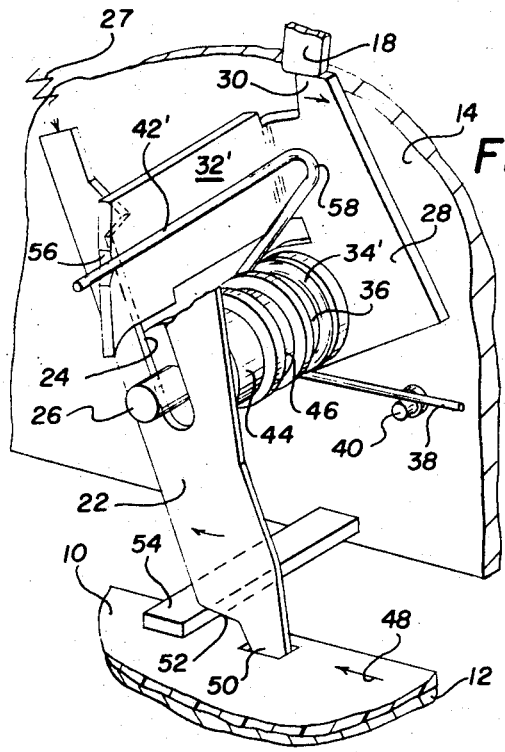
FIGS. 5 and 6 are perspective sectional views of a portion of a camera in accordance with an embodiment of the present invention.
Figure 6:
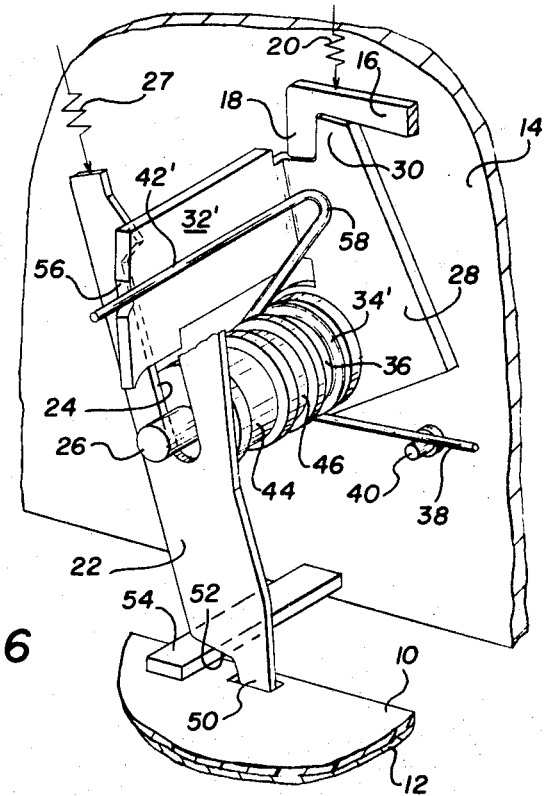
Figure 7:
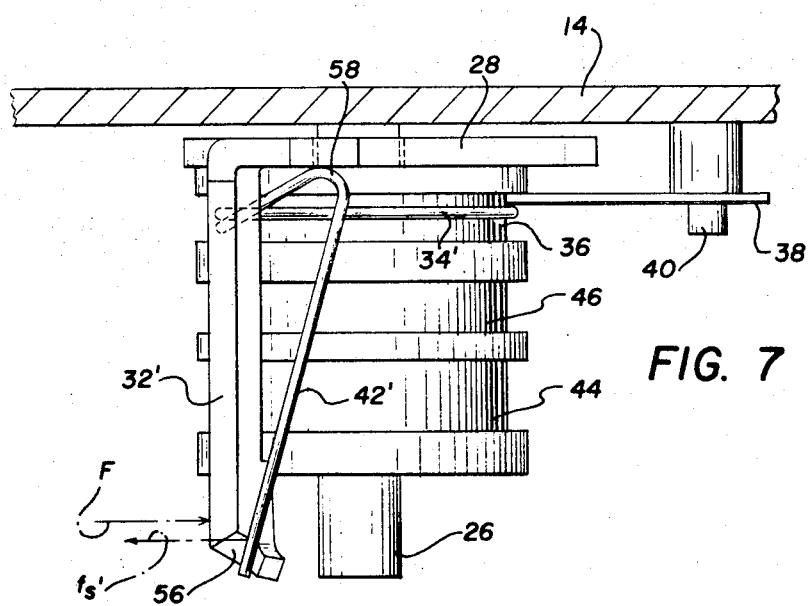
FIG. 7 is a top sectional view of the camera shown in FIGS. 5 and 6.

As a feature of the present invention, I have devised a mechanism in which the forces on latching member 28 do not tend to urge the latching member into frictional engagement with the surface of mechanism plate 14. Referring to FIGS. 5–7, I have shown a preferred embodiment of the present invention wherein camera elements which are the same as those shown in FIGS. 1–4 have been referred to by the same reference numerals. Some of the camera elements have been modified, and these modified elements are referred to by the same reference numerals with a prime mark. Latching member 28 has been modified so that its abutment portion 32' has a notch 56 on the end facing away from mechanism plate 14. Spring 34' has been modified so that leg 42' is turned at 58 and extends generally along abutment portion 32' to rest within notch 56 so that the force $f_s'$ of spring 34' against the abutment portion is generally in the plane of force F from sensing pawl 22.

Now, as the sensing pawl is moved from its extended position as shown in FIG. 5 to its metered position, FIG. 6, by the trailing edge of the perforation as a frame of film is advanced, force F of sensing pawl 22 against abutment portion 32' of latching member 28 is opposed by force $f_s'$ from spring 34' generally in the same plane. Thus, there is no force moment acting on the latching member to force the member into engagement with the mechanism plate. This is illustrated in FIG. 7. As such, when the shutter is tripped, camera vibrations do not cause a loss of frictional resistance between latch member 28 and plate 14 as is the case in the prior art embodiment shown in FIGS. 1–4. Accordingly, there is less force serge on the pawl tending to move the film during exposure, and therefore less risk of blurred pictures.

As can be seen from the above, I have provided a mechanism for eliminating one cause of film movement by reducing the amount of force serge on the film sensing pawl during exposure. The invention has been described in detail with particular reference to a preferred embodiment thereof, but it will be understood that variations and modifications can be effected within the spirit and scope of the invention.

I claim:

1. In a camera housing (1) means for receiving roll film perforated at predetermined metering intervals, (2) a transport mechanism for advancing received film along a camera exposure plane, (3) a metering lever movable in a first plane between an active position disabling said transport mechanism and an inactive position, (4) spring means for urging said metering lever towards its active position, (5) a film sensing member movable in a second plane spaced from and parallel to said first plane from a retracted position on one side of said exposure plane, to an extended position transversing said exposure plane when intercepting one of the film perforations and to a metering position by the trailing edge of the film perforation as the film is advanced along the exposure plane, (6) a latch member mounted for movement is said first plane and second plane between a latch position and a release position, (7) an abutment on said latch member in said first plane for blocking movement of said metering lever to its active position when said latch member is in its latch position, (8) an abutment on said latch member in said second plane contactable by said film sensing pawl for moving said latch member from its latch position to its release position during movement of said sensing pawl from its extended position to its metering position, and (9) spring means for urging said latch member toward its latch position; the improvement wherein said spring means is mounted to apply a resilient force to said latch member substantially in said second plane so as to minimize, during movement of said latch member to its release position, any force moment on said latch member caused by forces applied thereto by said spring means and said sensing lever.

2. The improvement as defined in claim 1 wherein said latch member is rotatably movable about an axis perpendicular to said first and second planes.

3. The improvement as defined in claim 2 wherein said spring means comprises a wire torsion spring having:
   a portion looped about said axis between said first and second planes and adjacent to said first plane;
   a first leg engaging an abutment in said camera; and
   a second leg extending laterally perpendicular to said first plane toward said second plane to engage said latch member substantially in said second plane.

4. In a camera having (1) means for receiving roll film perforated at predetermined metering intervals, (2) a transport mechanism for advancing received film along an exposure plane, (3) means defining a planar surface perpendicular to said exposure plane, (4) a metering lever movable in a first plane parallel to and adjacent said surface between an active position disabling said transport mechanism and an inactive position, (5) a post extending perpendicular to said surface, (6) a film sensing member mounted on said post for movement in a second plane spaced from and parallel to said first plane from a retracted position on one side of said exposure plane longitudinally to an extended position transversing said exposure plane when intercepting one of the film perforations and rotatably from its extended position to a metering position by the trailing edge of the film perforation as the film is advanced along the exposure plane, (7) a latch member having a first portion in said first plane mounted for rotational movement about said post between a latch position and a release position and a second portion extending from said first portion in a direction generally parallel to said post toward and through said second plane contactable by said film sensing pawl in said second plane for moving said first portion from its latch position to its release position during movement of said sensing pawl from its extended position to its metering position, (8) an abutment on said first portion of said latch member for blocking movement of said metering lever to its active position when said latch member is in its latch position; the improvement comprising spring means for urging said latch member toward its latch position, said spring means applying a resilient force to said latch member substantially in said second plane so as to minimize any force moment on said latch member during movement of said member to its release position which would tend to move said first portion into frictional engagement with said surface.

5. The improvement as defined in claim 4 wherein said spring means comprises a wire torsion spring having:
   a portion looped about said post between said first and second planes and adjacent said first plane;
   a first leg engaging an abutment in said camera; and
   a leg extending generally parallel to said post toward said second plane to engage said second portion substantially in said second plane.

* * * * *